(12) United States Patent
Fister et al.

(10) Patent No.: US 10,096,807 B2
(45) Date of Patent: Oct. 9, 2018

(54) BATTERY SYSTEM

(71) Applicant: SAMSUNG SDI CO., LTD., Yongin-si, Gyeonggi-do (KR)

(72) Inventors: Kevin Fister, Graz (AT); Helmut Rath, Weinburg a.S. (AT)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 1004 days.

(21) Appl. No.: 14/259,615

(22) Filed: Apr. 23, 2014

(65) Prior Publication Data

US 2015/0311485 A1    Oct. 29, 2015
US 2018/0123095 A9    May 3, 2018

(30) Foreign Application Priority Data

Apr. 25, 2013  (DE) .................. 10 2013 207 592

(51) Int. Cl.
| | |
|---|---|
| *H01M 2/10* | (2006.01) |
| *H01M 10/04* | (2006.01) |
| *H01M 10/6556* | (2014.01) |
| *H01M 10/613* | (2014.01) |
| *H01M 10/625* | (2014.01) |
| *H01M 10/6554* | (2014.01) |
| *H01M 2/20* | (2006.01) |
| *H01M 10/48* | (2006.01) |

(52) U.S. Cl.
CPC ..... *H01M 2/1077* (2013.01); *H01M 10/0413* (2013.01); *H01M 10/613* (2015.04); *H01M 10/625* (2015.04); *H01M 10/6554* (2015.04); *H01M 10/6556* (2015.04); *H01M 2/206* (2013.01); *H01M 10/482* (2013.01); *H01M 10/486* (2013.01); *H01M 2220/20* (2013.01)

(58) Field of Classification Search
CPC ............ H01M 2/1077; H01M 10/613; H01M 10/6556; H01M 10/6554; H01M 10/625; H01M 2220/20
USPC .................................................. 429/151–155
See application file for complete search history.

(56) References Cited

U.S. PATENT DOCUMENTS 5,981,101 A * 11/1999 Stone .................. H01M 2/1077
                                                         429/100
7,323,271 B2 * 1/2008 Marraffa ............. H01M 10/121
                                                         429/100
(Continued)

FOREIGN PATENT DOCUMENTS

CN         2 674 657 Y      1/2005
EP         2 343 752 A2     7/2011
(Continued)

*Primary Examiner* — Michael L Dignan
(74) *Attorney, Agent, or Firm* — Lewis Roca Rothgerber Christie LLP

(57) ABSTRACT

A battery system having at least a pair of battery modules, each battery module having a base plate and a cell stack secured on a base surface of the base plate. A first offset is arranged on a first side of the base plate and a first section is arranged on a second side opposite the first side. First threaded holes are arranged in the first offset and in the first section, parallel to the direction of extent of the first offset and of the first section. The battery modules are connected to one another via the auxiliary frame by screwing into the first threaded holes through through-holes arranged in the auxiliary frame.

19 Claims, 17 Drawing Sheets

(56) References Cited

U.S. PATENT DOCUMENTS

| | | | | |
|---|---|---|---|---|
| 9,023,504 B2 * | 5/2015 | Kim | ................. | H01M 10/02 |
| | | | | 429/129 |
| 9,034,506 B2 * | 5/2015 | Michelitsch | ........ | B60L 11/1879 |
| | | | | 429/120 |
| 9,614,196 B2 * | 4/2017 | Lee | ................. | H01M 2/0247 |
| 2002/0015880 A1 * | 2/2002 | Heimer | ............... | H01M 2/1072 |
| | | | | 429/97 |
| 2009/0305116 A1 * | 12/2009 | Yang | ................. | H01M 2/0212 |
| | | | | 429/61 |
| 2010/0215998 A1 * | 8/2010 | Byun | ................. | H01M 2/1077 |
| | | | | 429/82 |
| 2011/0143179 A1 * | 6/2011 | Nakamori | ............... | B60K 1/04 |
| | | | | 429/99 |
| 2012/0121959 A1 * | 5/2012 | Yamada | ................ | B60K 1/04 |
| | | | | 429/100 |
| 2013/0288094 A1 * | 10/2013 | Noh | ................. | H01M 2/1077 |
| | | | | 429/99 |
| 2017/0025719 A1 * | 1/2017 | Yamada | ............. | H01M 2/1077 |

FOREIGN PATENT DOCUMENTS

| | | | | |
|---|---|---|---|---|
| EP | 2 390 941 A1 | 11/2011 | | |
| WO | WO 2011/076940 | * | 6/2011 | ............. H01M 2/10 |

\* cited by examiner

BATTERY SYSTEM

CROSS-REFERENCE TO RELATED APPLICATIONS

The present application claims priority 35 U.S.C. § 119 to German Patent Publication No. DE 10 2013 207 592.8 (filed on Apr. 25, 2013) which is hereby incorporated by reference in its entirety.

TECHNICAL FIELD

Embodiments relate to a battery system having at least one first and one second battery module, each battery module comprising a base plate, a cell stack secured on a base surface of the base plate, and at least one auxiliary frame, in which a first offset is arranged on a first side of the base plate and a first section is arranged on a second side, situated opposite the first side.

BACKGROUND

Battery systems having battery modules are used especially as energy storage devices in motor vehicles, e.g., for driving electric and hybrid vehicles. In such applications, there is a desire for the greatest possible compactness in the external dimensions of the battery system. Moreover, the battery system should have a high rigidity to avoid being damaged in an accident involving the motor vehicle or when subjected to incorrect loads while the battery system is being installed in the motor vehicle. However, these requirements conflict with good accessibility for the individual components of the battery system during the installation thereof. Generous clearances between the individual components would be advantageous for this.

U.S. Patent Publication No. 2012/0121959 A1 discloses a battery unit for a vehicle, having a base surface in the battery body which is designed to hold battery modules, and having a hollow frame, which is arranged along the base surface. Brackets, on which the battery modules are secured on the hollow frame, project from the longitudinal end faces of the battery modules.

SUMMARY

Embodiments relate to enhanced battery systems of the stated type that permit easier access during installation of the battery system, and, in particular, has compact external dimensions and high rigidity.

In accordance with embodiments, a battery system may include at least one of: at least one first and one second battery module, each battery module comprising a base plate, a cell stack secured on a base surface of the base plate, and at least one auxiliary frame, wherein a first offset is arranged on a first side of the base plate and a first section is arranged on a second side, situated opposite the first side, first threaded holes are arranged in the first offset and in the first section, parallel to the direction of extent of the first offset and of the first section, the battery modules being connected to one another via the auxiliary frame by screwing into the first threaded holes through through-holes arranged in the auxiliary frame.

In accordance with embodiments, a secure assembly of battery modules is created by connecting the battery modules by screwing to the at least one auxiliary frame. Here, the base plate with the first offset and the first section may be embodied in such a rigid way that the assembly may be handled as a whole after screwing has been performed. For example, the assembly may be lifted as a whole from one assembly station to the next. At the same time, the interfaces between the modules are still readily accessible, e.g., for the connection of coolant lines or for making the electrical connection between adjacent battery modules. Here, the at least one auxiliary frame may be embodied as a sheet metal stamping. This results in only an insignificant increase in the external dimensions of the assembly in relation to the individual battery modules. It is particularly advantageous if a first auxiliary frame is arranged at a first end of the battery modules, and a second auxiliary frame is arranged at a second end, situated opposite the first end of the battery modules. This makes the assembly even more rigid since the battery modules are connected by the auxiliary frames at two ends.

A bottom edge of the first offset of the second battery module may be arranged above a top edge of the first section of the first battery module in the installed position of the battery system, ensuring that, along its first section, the first battery module may be arranged snugly against the first offset of the second battery module. This further reduces the dimensions of the assembly since there is only a single offset width or a single section width between adjacent battery modules.

In accordance with embodiments, the battery system may also include a housing having a housing shell and a housing cover, in which second threaded holes are arranged in the first offset, perpendicularly to the base surface, and second through-holes are arranged in the first section, perpendicularly to the base surface, the battery modules being connected to the housing shell by screwing into the second threaded holes in the first offset through through-holes in the housing shell and through the second through-holes in the first section. Advantageously, no additional frame elements are required to secure the assembly in the housing shell. In addition, the housing shall may be embodied with thin walls, e.g., as a deep drawn sheet metal part, since the assembly of the base plates and auxiliary frame already has a high rigidity. As a result, the housing shell serves primarily to protect the battery system from external influences and contributes only slightly to the rigidity of the battery system.

If no further battery module is arranged along the first section of a battery module, the first section has second threaded holes instead of the second through-holes.

In accordance with embodiments, each battery module may have a covering cap, in which a third offset is arranged on a first side of the covering cap and a second section is arranged on a second side, situated opposite the first side of the covering cap. The covering cap accommodates and holds cell connectors, through which terminals of cells that are adjacent in the cell stack are connected to one another, cell voltage taps and measurement lines connected thereto, or even temperature sensors, for example. If the covering caps have a suitably high inherent rigidity, third threaded holes may be arranged in the third offset and in the second section, parallel to the direction of extent of the third offset and of the second section, the battery modules being connected to one another via the auxiliary frame by screwing into the third threaded holes through through-holes arranged in the auxiliary frame. Advantageously, this additionally increases the rigidity of the assembly. In a manner similar to the embodiment of the first offset and the first section, a bottom edge of the third offset of the second battery module may be arranged spatially above a top edge of the second section of the first battery module in the installed position of the battery system. The covering cap may be connected to the base plate by way of screws with threaded connecting holes provided in the base plate, for example. For this purpose, the covering cap has corresponding through-holes. As an alternative, it is also possible for the threaded connecting holes to be arranged in the covering cap and for the through-holes to be arranged in the base plate.

In accordance with embodiments, the third offset may have fourth through-holes and the second section has fourth threaded holes. The fourth through-holes in the third offset of a first battery module are congruent with the fourth threaded holes in the second section of a second battery module adjacent to the first battery module. As a result, screw fasteners lead through through-holes in the housing cover, through the through-holes in the third offset of the second battery module and into the threaded holes in the second section of the first battery module. In this way, surfaces of the third offset of the second battery module are pressed against surfaces of the second section of the first battery module. This brings about enhanced rigidity of the assembly of the first and second battery modules. If no further battery module is arranged along the third offset of a battery module, the third offset may have fourth threaded holes instead of the fourth through-holes.

In accordance with embodiments, the base plate of each battery module may have a first web which extends from the first offset, perpendicularly to the base surface of the base plate. This is advantageous especially if the covering cap does not have a third offset and a second section. The first web has fifth threaded holes parallel to the direction of extent of the first web, wherein the battery modules are connected to the housing cover by screwing into the fifth threaded holes through through-holes in the housing cover. In this embodiment, the fifth threaded holes replace the fourth threaded holes. The first web may also have sixth threaded holes parallel to the direction of extent of the first offset and of the first section, wherein the battery modules are connected to one another via the auxiliary frame by screwing into the sixth threaded holes through through-holes in the auxiliary frame. In this embodiment, the sixth threaded holes replace the third threaded holes. This embodiment has the advantage that only the base plate needs to have the rigidity required for connection to the auxiliary frame and the housing shell/housing cover. In this case, the covering cap must merely have the required inherent rigidity to hold the cell connectors, cell voltage taps, measuring lines and temperature sensors. By way of this functional separation, the weight of the battery system may be reduced.

In accordance with embodiments, the base plate of each battery module may have a second web, which extends from the first section, perpendicularly to the base surface of the base plate. The second web has a smaller width and a smaller height than the first web. The second web is used to extend the air gap and creepage distance between two adjacent battery modules. When screwing through the through-holes in the housing shell, through the second through-holes and into the second threaded holes, there is surface pressure between a surface of the first offset of the second battery module and a surface of the first section of the first battery module. In order to ensure reliability of the screwing process, the surfaces involved should be as flat as possible and have no coating. Electrical insulating measures, such as an electrically insulating paint coating on these surfaces, are therefore disadvantageous. A differential voltage may arise between the electrically conductive cell housings of the cells in the cell stack and the offsets. If the base plate is metallic and hence electrically conductive, a leakage current or even an arc may form between a cell housing and the first offset or the first section. The formation of the second web enables the air gap and creepage distance between the cell housing and the first offset or first section to be increased to a sufficient extent. That side of the second web which faces the cell stack of the battery module may be provided with an electrically insulating coating. That side of the first web which faces the cell stack of the battery module may likewise be provided with an electrically insulating coating.

In accordance with embodiments, that side of the first web which faces away from the cell stack of the battery module may have a recess. This recess is formed in the second battery module to receive the second web of the first battery module. This recess enables the battery modules to be arranged as close as possible to one another.

In accordance with embodiments, the base plate may be designed as a cooling element with internal cooling ducts. If the base plate is produced by extruding a metal such as, for example, aluminium, it is a simple matter to form hollow profiles that serve as cooling ducts in the direction of extrusion. The base plate formed in this way is thus distinguished by high rigidity, low weight, good thermal conductivity and high integration density.

In accordance with embodiments, the cell stack of each battery module may be adhesively bonded to the base surface of the base plate associated with the cell stack. In this way, particularly simple attachment of the cell stack to the base plate is achieved, especially since there is no need for any separate fastening mechanism, such as hold-down devices, clamps or straps.

In accordance with embodiments, a battery module, along the first section of which no other battery module is arranged, may include an additional element having seventh threaded holes. This embodiment is advantageous particularly if the covering cap does not have any third or fourth threaded holes and if the base plate has a first web which extends from the first offset perpendicularly to the base surface of the base plate. In this case, a battery module, along the first section of which no other battery module is arranged, is connected to the adjacent battery module only by its first offset. An assembly formed in this way would have only a little rigidity. The additional element is screwed to the first auxiliary frame and the second auxiliary frame through the seventh threaded holes. This outermost battery module is thereby also accommodated rigidly in the assembly on the side of its base plate on which the first section is arranged. This increases the rigidity of the overall assembly.

Embodiments are not restricted to battery systems having two battery modules, and thus, may reasonably encompass greater than two battery modules. For example, the battery system may be expanded by further battery modules arranged adjacent to one another in the same way as the first and second battery modules. In this way, the entire battery system may be constructed in a modular manner and thus adapted according to power and capacity requirements.

In accordance with embodiments, all the threaded holes may be partially or completely replaced by threaded inserts if the material in which the threads are provided is not suitable for the introduction of threaded holes. As an alternative, weld nuts or cage nuts may also be employed, for example.

In accordance with embodiments, a vehicle battery system may include at least one of: at least two battery modules each having a base plate and a cell stack on a base surface of the base plate, the base plate having a first offset arranged on a first side of the base plate and a first section arranged on a second side opposite the first side, first threaded holes arranged in the first offset and the first section, parallel to a direction of extent of the first offset and the first section; and an auxiliary frame having auxiliary frame through holes which correspond to the first threaded holes to connect the battery modules to one another.

In accordance with embodiments, a vehicle battery system may include at least one of: at least two battery modules each having a base plate and a cell stack on a base surface of the base plate, the base plate having a first offset arranged on a first side of the base plate and a first section arranged on a second side opposite the first side, first threaded holes arranged in the first offset and the first section, and which lie parallel to a direction of extent of the first offset and the first section, second threaded holes arranged in the first offset, and which lie perpendicularly to the base surface, and second through-holes arranged in the first section, and which lie perpendicularly to the base surface; an auxiliary frame having auxiliary frame through holes which correspond to the first threaded holes to connect the battery modules to one another; and a housing having a housing shell, a housing cover, housing through holes and housing threaded holes which respectively correspond to the second through holes and the second threaded holes to connect the battery modules to the housing shell.

In accordance with embodiments, a vehicle battery system may include at least one of: at least two battery modules each having a base plate and a cell stack on a base surface of the base plate, the base plate having a first offset arranged on a first side of the base plate and a first section arranged on a second side opposite the first side, first threaded holes arranged in the first offset and the first section, and which lie parallel to a direction of extent of the first offset and the first section, second threaded holes arranged in the first offset, and which lie perpendicularly to the base surface, and second through-holes arranged in the first section, and which lie perpendicularly to the base surface; a first auxiliary frame arranged at a first end of the battery modules and having first auxiliary frame through holes which correspond to the first threaded holes to connect the battery modules to one another; a second auxiliary frame arranged at a second end opposite the first end of the battery modules and having second auxiliary frame through holes which correspond to the first threaded holes to connect the battery modules to one another; and a housing having a housing shell, a housing cover, housing through holes and housing threaded holes which respectively correspond to the second through holes and the second threaded holes to connect the battery modules to the housing shell.

In accordance with embodiments, a vehicle battery system may include at least one of: at least two battery modules each having a base plate and a cell stack on a base surface of the base plate, the base plate having: a first offset extending from a first side of the base plate; a first section arranged on a second side opposite the first side; first threaded holes arranged in the first offset and the first section, and which lie parallel to a direction of extent of the first offset and the first section, second threaded holes arranged in the first offset, and which lie perpendicularly to the base surface, second through-holes arranged in the first section, and which lie perpendicularly to the base surface; a first web which extends upwardly from the first offset and perpendicularly to the base surface of the base plate; an auxiliary frame to connect the battery modules to one another; and a housing connected to the battery modules, the housing having a housing shell, a housing cover

DRAWINGS

Embodiments will be illustrated by way of example in the drawings and explained in the description below.

DESCRIPTION

Figure 1:
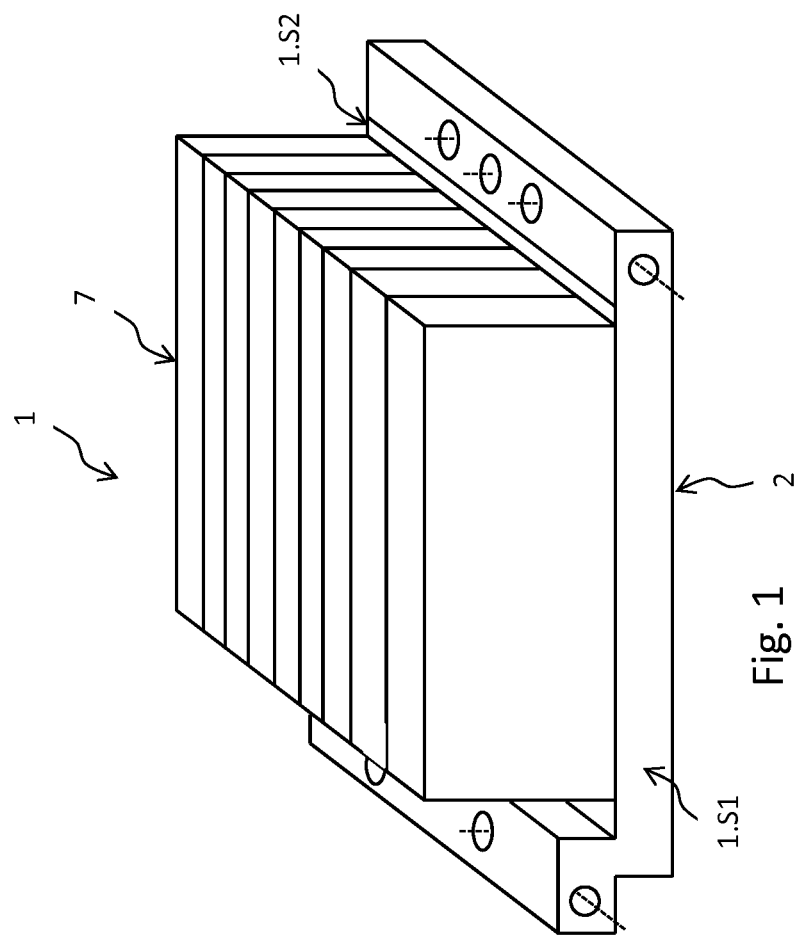
FIG. 1 illustrates a schematic view of a battery module, in accordance with embodiments.

A battery module 1 in accordance with embodiments is illustrated schematically in FIG. 1, and includes a first end 1.S1 and a second end 1.S2 which lies opposite the first end 1.S1. A cell stack 7 having a plurality of battery cells is secured in a suitable manner, e.g. by way of an adhesive bond, on a surface of base plate 2.

Figure 2:
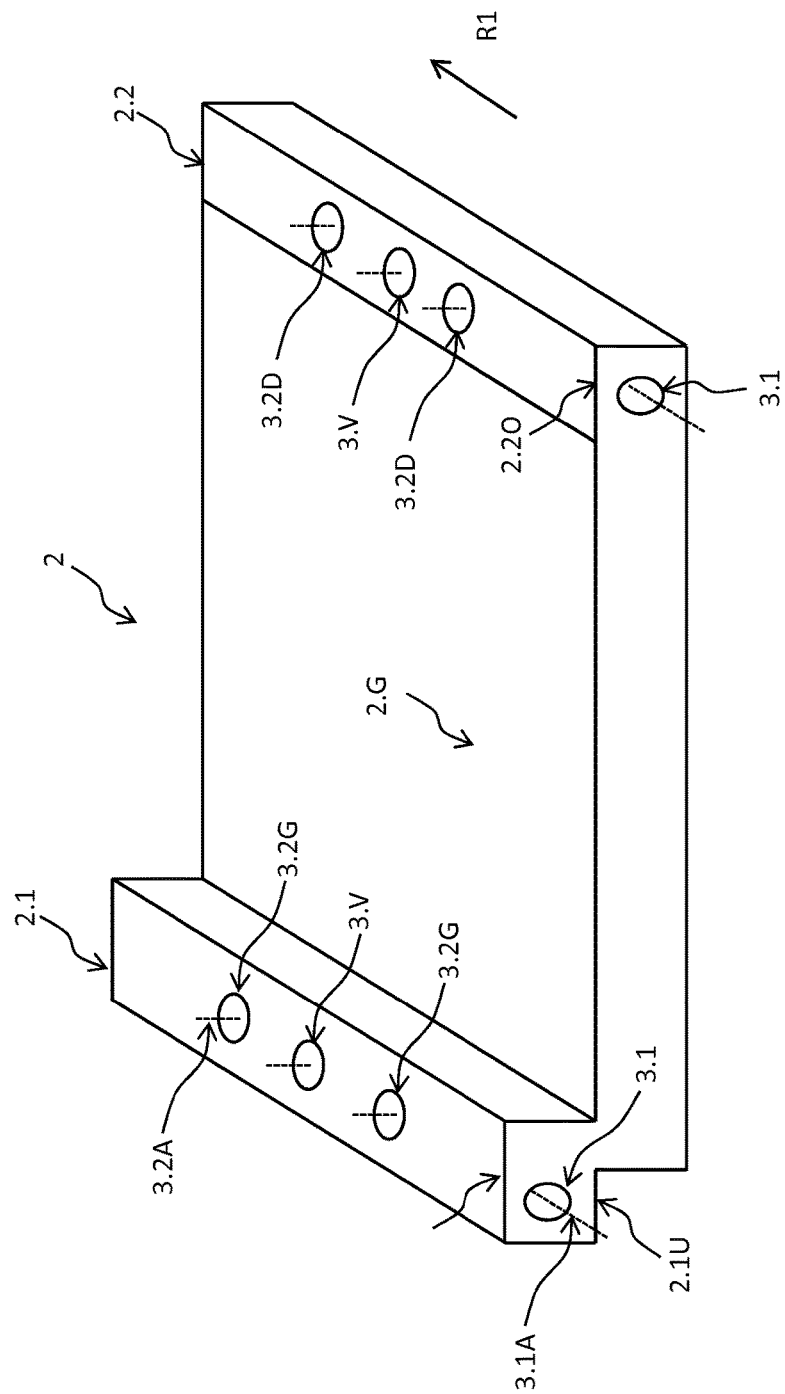
FIG. 2 illustrates a shows a schematic view of a base plate, in accordance with embodiments.

FIG. 2 illustrates a schematic view of the base plate 2. The base plate 2 has a base surface 2.G, on which the cell stack 7 may be secured. A first offset 2.1 is arranged on a first side of the base plate 2 and has an upper surface that lies in a plane spatially above base surface 2.G. The base plate 2 also has a first section 2.2 arranged on a second side, situated opposite the first side of where the first offset 2.1 is arranged. R1 indicates the direction of extent both of the offset 2.1 and of the first section 2.2. The base surface 2.G lies between the first offset 2.1 and the first section 2.2. First threaded holes 3.1 are arranged both in the first offset 2.1 and in the first section 2.2. The axial directions 3.1A of the first threaded holes are parallel to the direction R1 of extent. The first offset 2.1 and the first section 2.2 are arranged at different spatial heights relative to the base surface 2.G. A bottom edge 2.1U of the first offset 2.1 is arranged spatially above a top edge 2.2O of the first section, in particular. In accordance with embodiments, "above" is to be understood in connection with the installation position of the battery system. In the installed position, the base surface 2.G is aligned horizontally, and the cell stack 7 extends upwardly from the base surface 2.G. Second threaded holes 3.2G are arranged in the first offset 2.1, while second through-holes 3.2D are arranged in the first section 2.2. The axial directions 3.2A of the second threaded holes 3.2G and second through-holes 3.2D extend perpendicularly to the base surface 2.G. In addition, threaded connecting holes 3.V, which serve to connect the base plate 2 to a covering cap 5, are arranged in the first offset 2.1 and in the first section 2.2.

Figure 3:
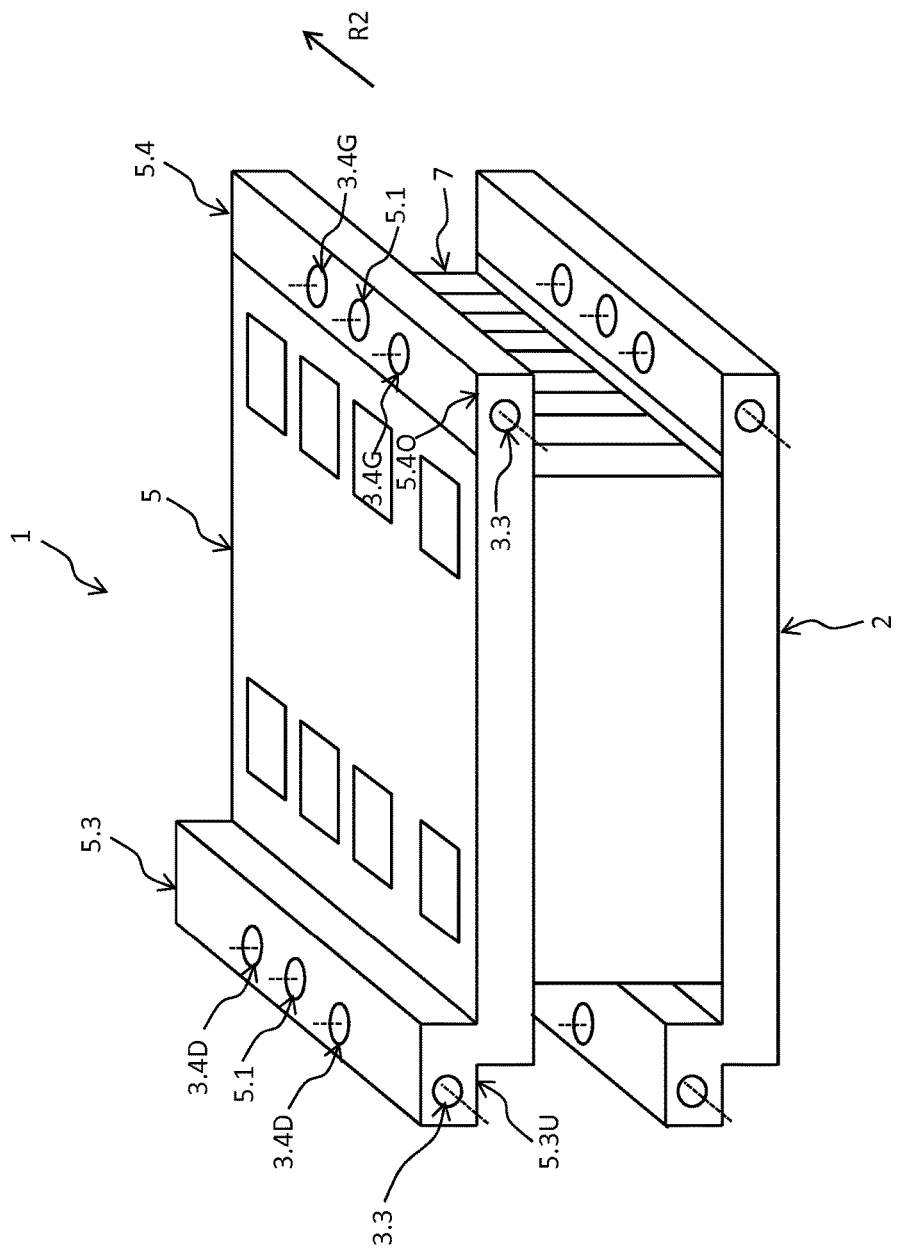
FIG. 3 illustrates a schematic view of a battery module with a covering cap, in accordance with embodiments.

FIG. 3 illustrates a schematic view of the battery module 1 with a covering cap 5 which accommodates and holds cell connectors, measuring lines and/or temperature sensors, for example. The covering cap 5 rests on the cell stack 7. The covering cap 5 may also have an electronic unit. However, for the sake of clarity, these components are not illustrated. A third offset 5.3 is arranged on a first side of the covering cap 5, and a second section 5.4 is arranged on a second side of the covering cap 5 situated opposite the first side. The covering cap 5 may have a high inherent rigidity, making the covering cap 5 suitable for accepting forces for the connection of the battery modules 1. For this purpose, third threaded holes 3.3 are arranged in the third offset 5.3 and in the second section 5.4, parallel to the direction R2 of extent of the third offset and of the second section 5.3, 5.4. The third offset 5.3 has fourth through-holes 3.4D, while the second section 5.4 has fourth threaded holes 3.4G. The third offset 5.3 and the second section 5.4 furthermore have through-holes 5.1. As with the configuration of the base plate 2, a bottom edge 5.3U of the third offset 5.3 is arranged spatially above a top edge 5.4O of the second section 5.4 in the installed position of the battery system.

A screw 8 may engage in the threaded connecting holes 3.V in the base plate 2, may be inserted through each through-hole 5.1. The covering cap 5 is thereby mechanically connected to the base plate 2, and the cell stack 7 is clamped between the base plate 2 and the covering cap 5.

Figure 4:
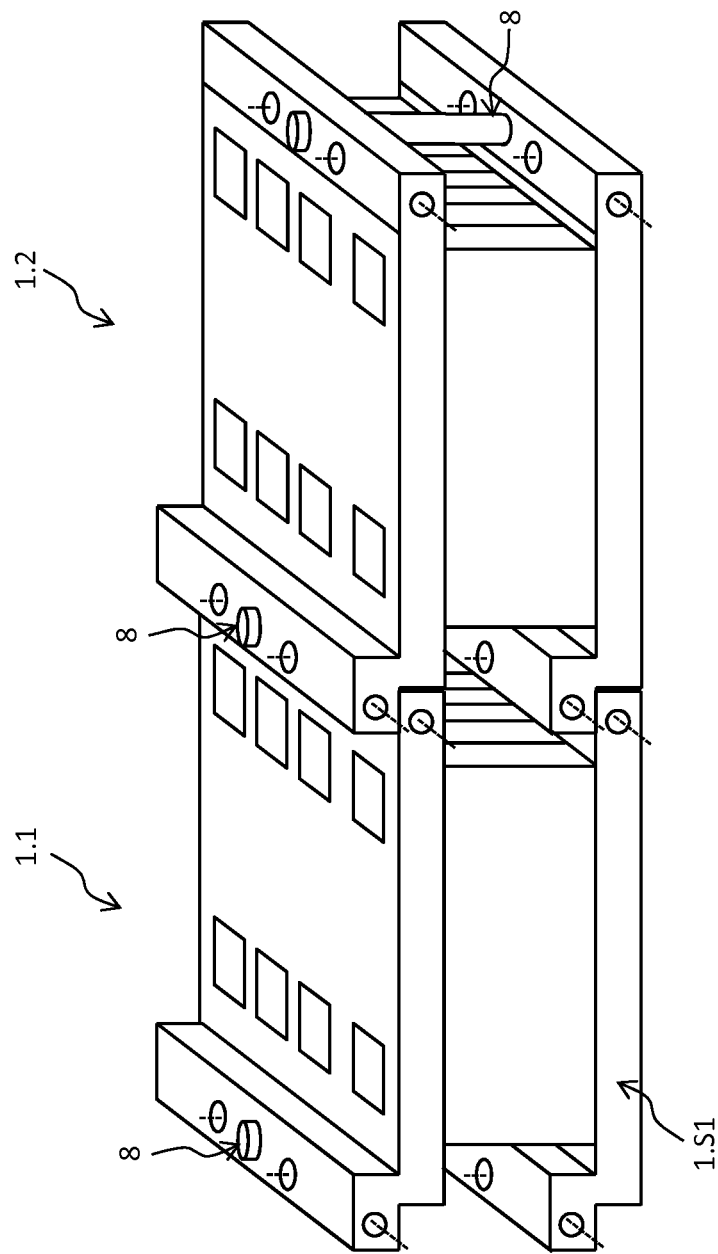
FIG. 4 illustrates a schematic view of two battery modules, in accordance with embodiments.

FIG. 4 illustrates a schematic view of a first battery module 1.1 and of a second battery module 1.2. The two battery modules 1.1, 1.2 are aligned in such a way relative to one another that the first end 1.S1 of both battery modules 1.1, 1.2 faces in the same direction and forms a common plane. The second battery module 1.2 is arranged in such a way that the first offset 2.1 of the second battery module 1.2 lies spatially above the first section 2.2 of the first battery module 1.1. In the same way, the third offset 5.3 of the second battery module 1.2 comes to lie above the second section 5.4 of the first battery module 1.1. In this way, the first and second battery modules 1.1, 1.2 may rest particularly snugly against one another, with the result that the dimensions of the overall battery system are small. In this arrangement of the two battery modules 1.1, 1.2, the second through-holes 3.2D in the first section 2.2 of the first battery module 1.1 are congruent with the second threaded holes 3.2G in the first offset 2.1 of the second battery module. The screws 8 connect the covering caps 5 to the associated base plates 2, wherein the screws 8 are passed through the through-holes 5.1 in the covering cap 5 and engage in the threaded connecting holes 3.V in the base plate 2.

Figure 5:
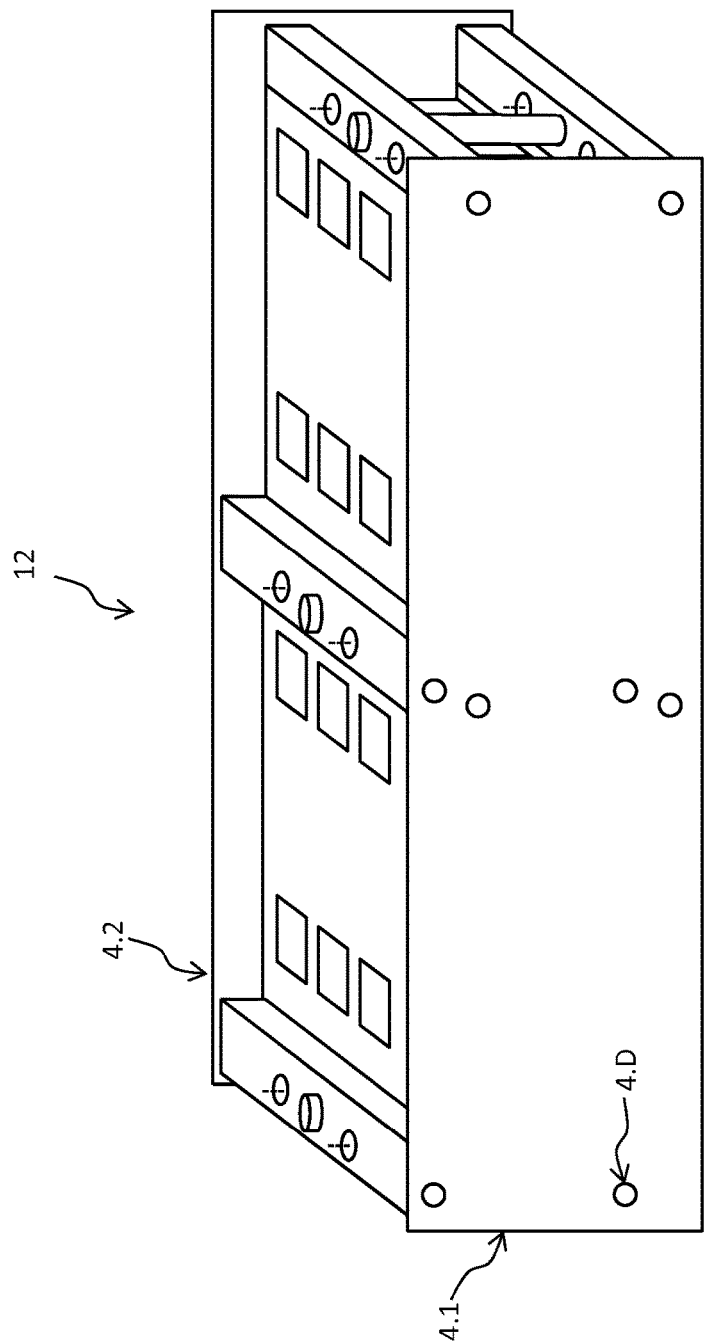
FIG. 5 illustrates a schematic view of two battery modules with auxiliary frames, in accordance with embodiments.

FIG. 5 illustrates a schematic view of the first and second battery modules 1.1, 1.2 with a first auxiliary frame 4.1 and a second auxiliary frame 4.2. The first auxiliary frame 4.1 is arranged along the first end 1.S1 of the first and second battery modules 1.1, 1.2 and has through-holes 4.D. A second auxiliary frame 4.2, which likewise has through-holes 4.D is arranged along the second end 1.S2. The through-holes 4.D in the auxiliary frames 4.1, 4.2 are congruent with the first threaded holes 3.1 and the third threaded holes 3.3 when the battery modules 1.1, 1.2 are arranged along the first and third offsets 2.1, 5.3 and the first and second sections 2.2, 5.4, as illustrated in FIG. 4. The battery modules 1.1, 1.2 are connected to one another via the auxiliary frames 4.1, 4.2 by screwing into the first and third threaded holes 3.1, 3.3 through the through-holes 4.D in the auxiliary frames 4.1, 4.2, thereby forming an assembly 12. The screws are not illustrated for the sake of clarity.

Figure 6:
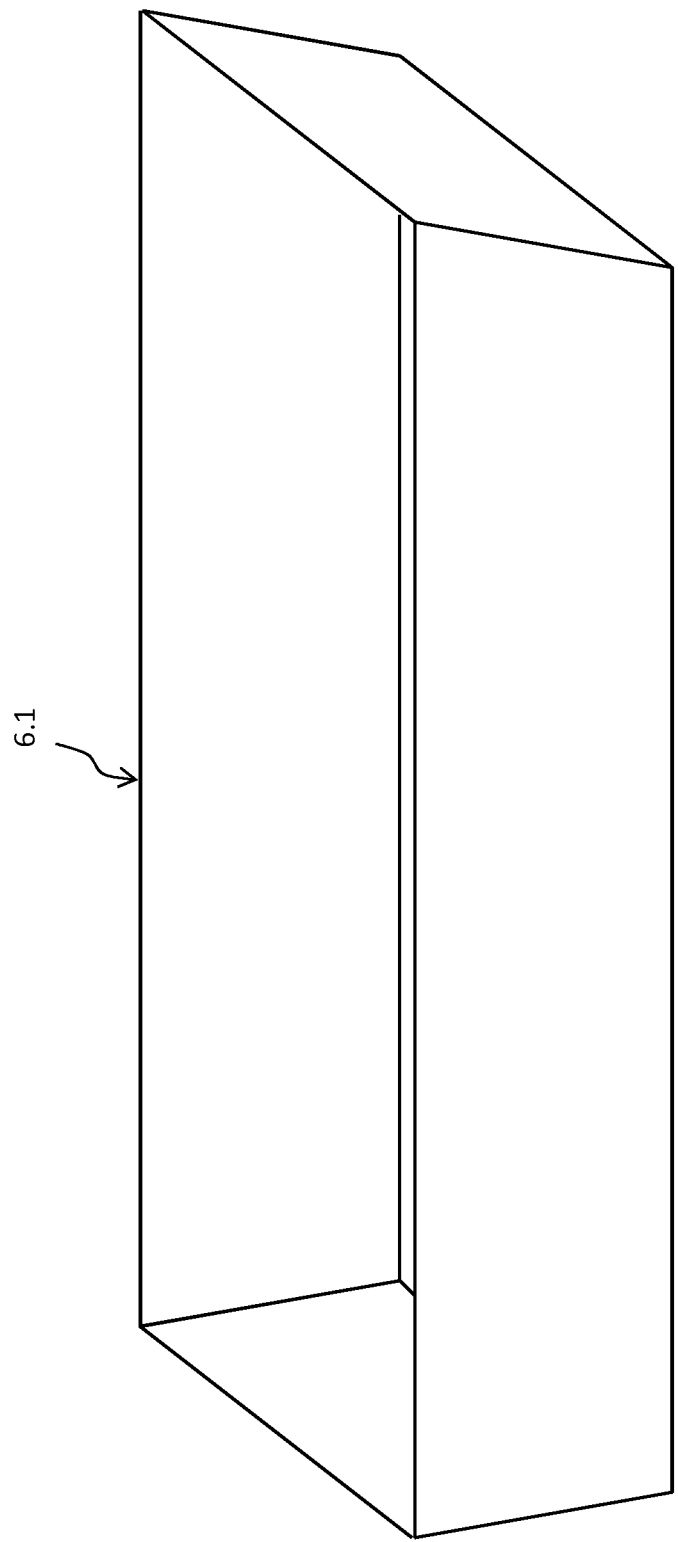
FIG. 6 illustrates a schematic view of a housing shell, in accordance with embodiments.
Figure 7:
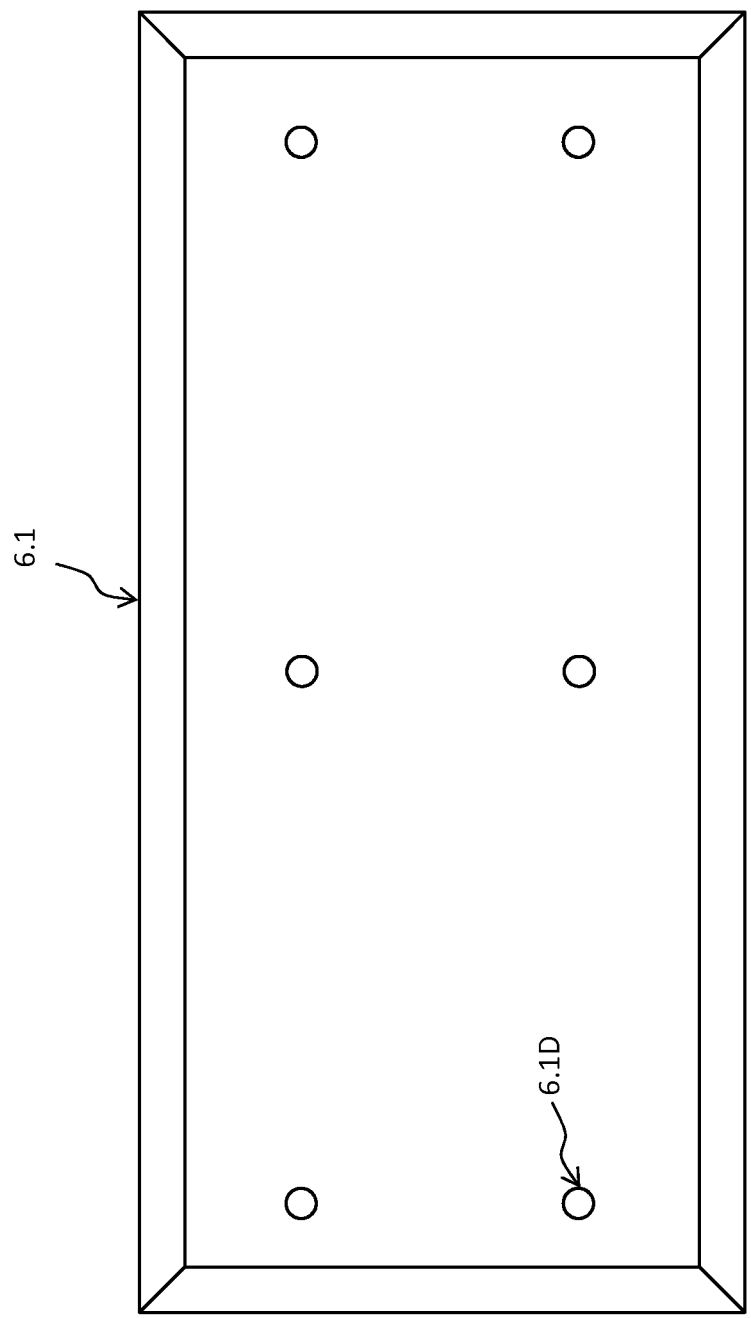
FIG. 7 illustrates a schematic plan view of the housing shell, in accordance with embodiments.

FIGS. 6 and 7 respectively illustrate a schematic view and a schematic plan view of a housing shell 6.1. The bottom of the housing shell 6.1 has through-holes 6.1D. The through-holes 6.1D are arranged in such a way that they are congruent with the second through-holes 3.2D as arranged in the assembly 12. The assembly 12 is secured in the housing shell 6.1 by screwing into the second threaded holes 3.2G through the through-holes 6.1D and through the second through-holes 3.2D.

Figure 8:
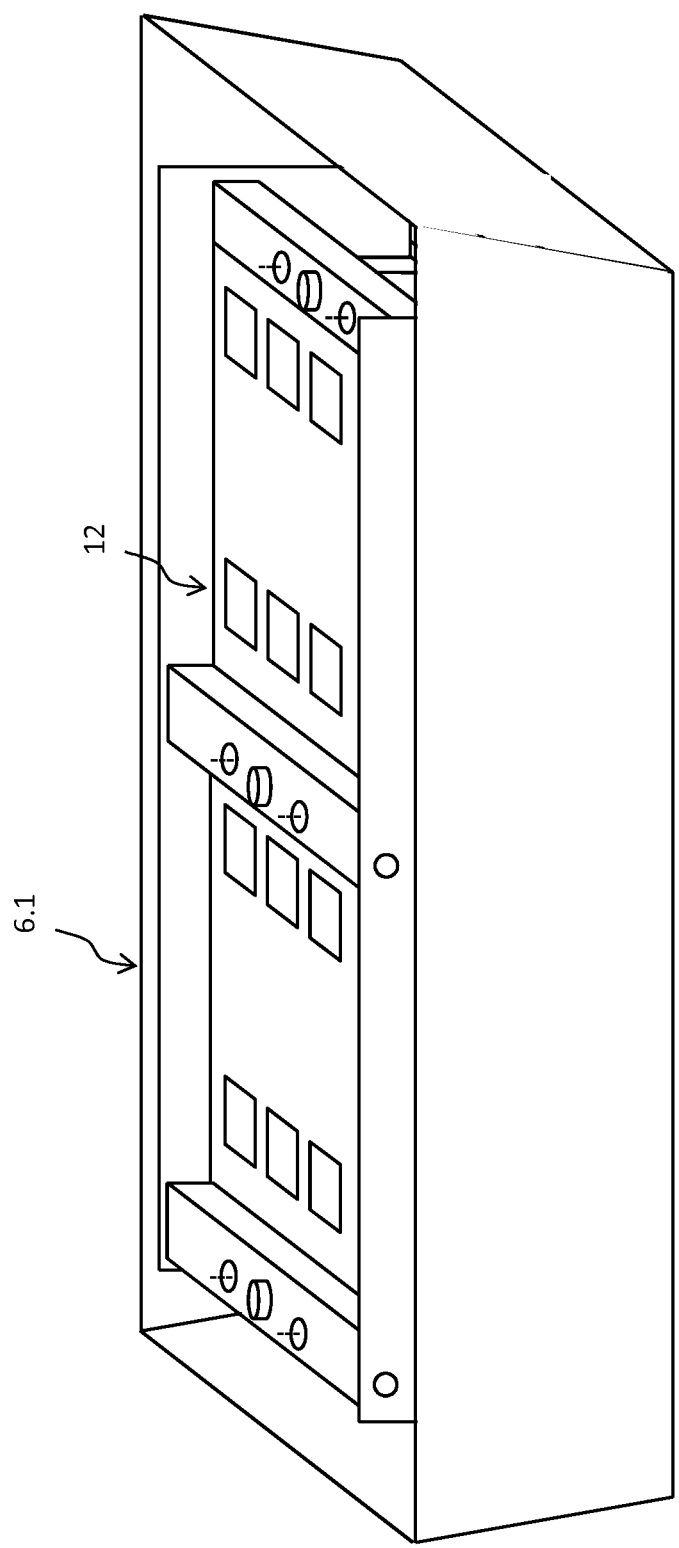
FIG. 8 illustrates a schematic view of two battery modules with auxiliary frames in the housing shell, in accordance with embodiments.

FIG. 8 illustrates the assembly of FIGS. 6 and 7 thus formed. The screws used for this purpose are not illustrated for the sake of clarity.

Figure 9:
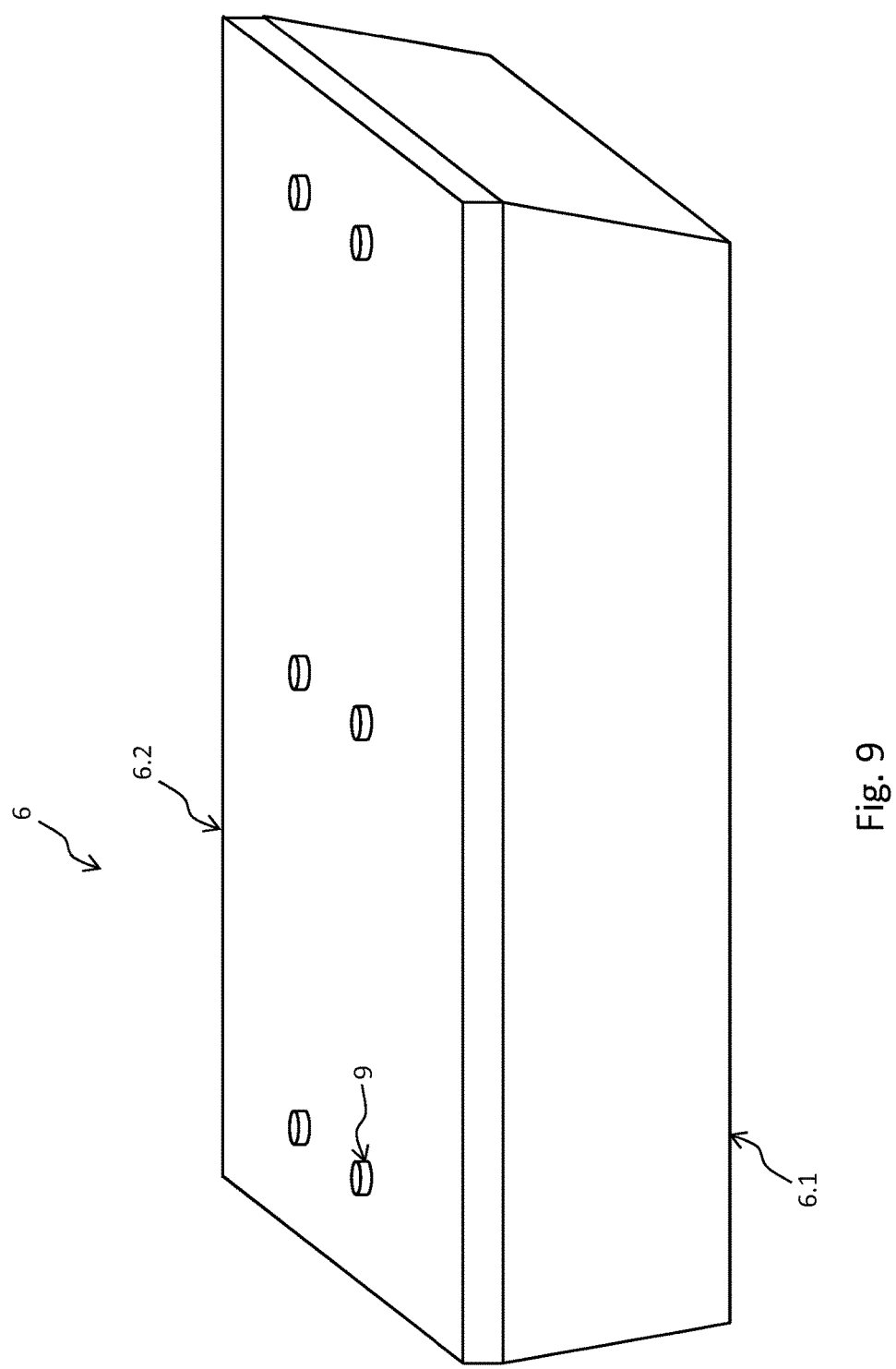
FIG. 9 illustrates a schematic view of a housing, in accordance with embodiments.
Figure 10:
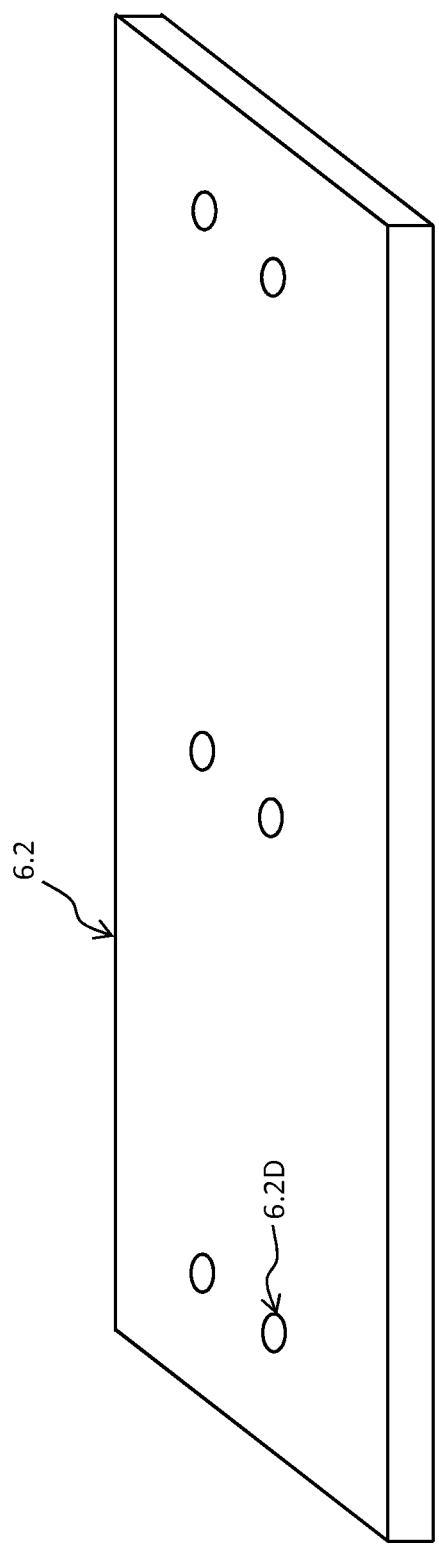
FIG. 10 illustrates a schematic view of a housing cover, in accordance with embodiments.

FIGS. 9 and 10 respectively illustrate a schematic view of a housing having a housing shell 6.1 and a housing cover 6.2 placed thereon, and a housing cover 6.2. The housing cover 6.2 has through-holes 6.2D, which are arranged congruently with the fourth through-holes 3.4D and fourth threaded holes 3.4G of the assembly 12. The assembly 12 is connected to the housing cover 6.2 by screws 9 entering the fourth threaded holes 3.4G through the through-holes 6.2D and through the fourth through-holes 3.4D. In this way, a particularly rigid attachment of the assembly 12 in the housing 6 is formed.

Figure 11:
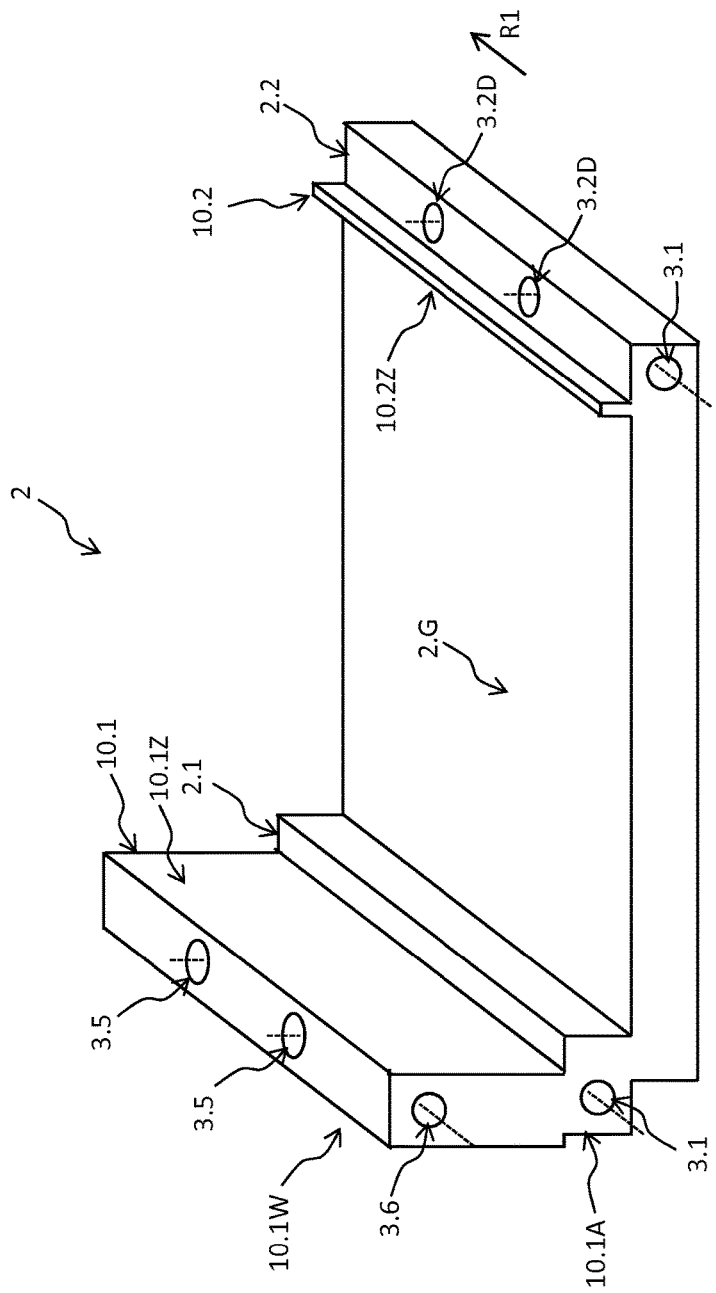
FIG. 11 illustrates a first schematic view of a base plate, in accordance with embodiments.
Figure 12:
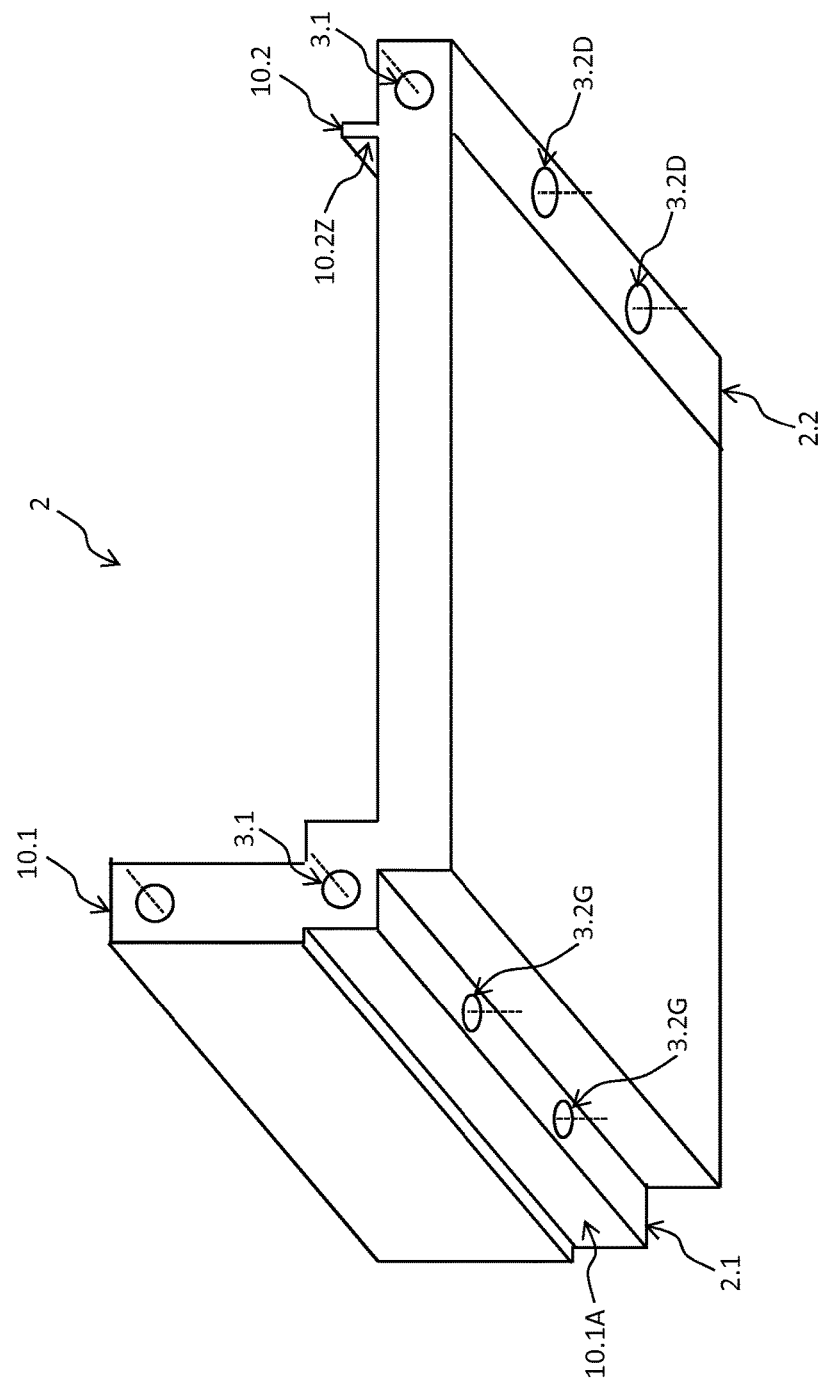
FIG. 12 illustrates a second schematic view of a base plate, in accordance with embodiments.

FIGS. 11 and 12 respectively illustrate schematic views of a base plate 2 having a first web 10.1 which extends upwardly from the first offset 2.1 and perpendicularly to the base surface 2.G of the base plate 2. The first web has fifth threaded holes 3.5, the axes of which are arranged parallel to the direction of extent of the first web 10.1. Screws may be introduced through through-holes 6.2D in the housing cover 6.2 and engage in the fifth threaded holes 3.5. The first web 10.1 furthermore has at least one sixth threaded hole 3.6, the axis of which extends parallel to the direction R1 of extent. That side 10.1Z of the first web 10.1 which faces the base surface 2.G and hence the cell stack 7 may be provided with an electrically insulating coating. That side 10.1W of the first web 10.1 which faces away from the base surface 2.G and hence from the cell stack 7 is likewise provided with an electrically insulating coating. That side 10.1W of the first web 10.1 which faces away from the base surface has a recess 10.1A. The recess 10.1A may also extend into regions of the first offset 2.1.

In this embodiment, the base plate 2 furthermore has a second web 10.2, which extends upwardly and perpendicularly to the base surface 2.G of the base plate 2. The second web 10.2 has a smaller width and a smaller height than the first web 10.1. The second web 10.2 is designed in such a way that, in an arrangement in which the first battery module 1.1 is aligned along its first section 2.2 with a second battery module 1.2 along the first offset 2.1 of the latter, it fits into the recess 10.1A of the first web 10.1. That side 10.2Z of the second web 10.2 which faces the base surface 2.G and hence the cell stack 7 is provided with an electrically insulating coating.

Figure 13:
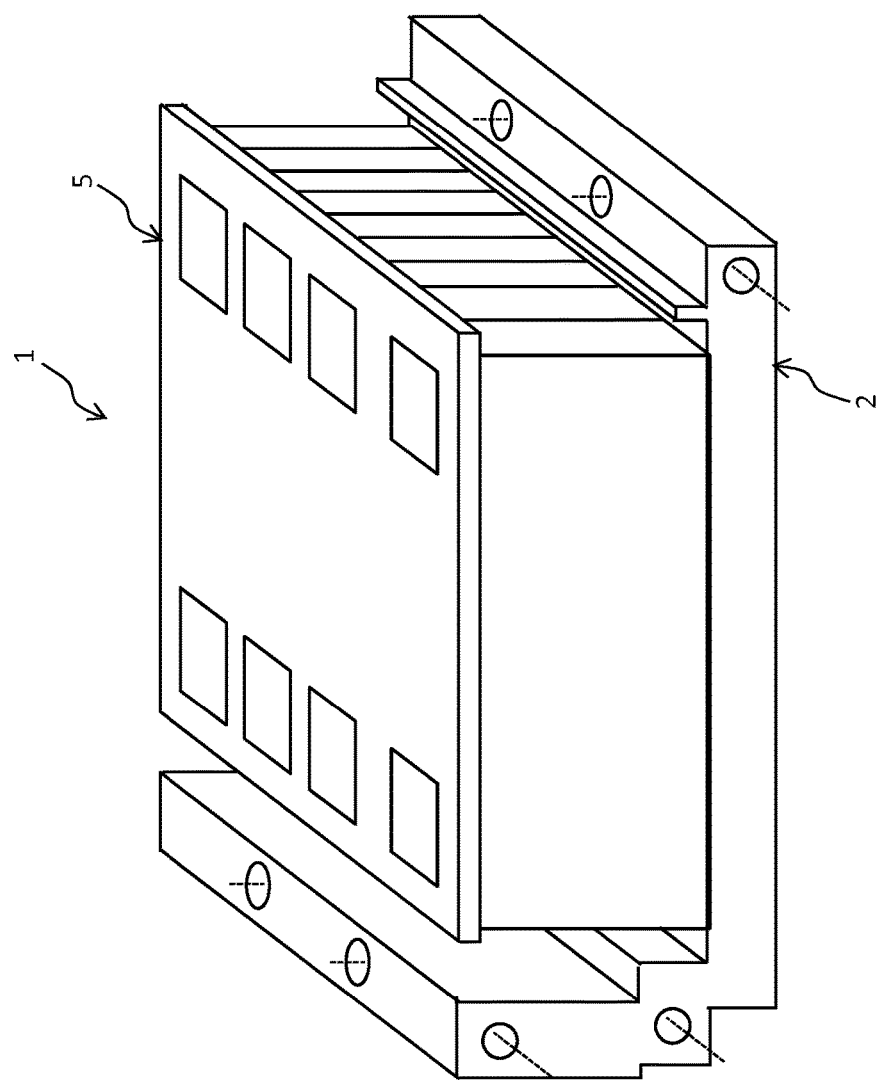
FIG. 13 illustrates a schematic view of a battery module having a base plate and a covering cap, in accordance with embodiments.

FIG. 13 illustrates a schematic view of a battery module 1 having the base plate 2 of FIGS. 11 and 12, and also a covering cap 5 which serves to hold cell connectors, cell voltage taps, measuring lines or temperature sensors (not illustrated). It may therefore be made significantly thinner and hence also lighter. The third offset 5.3 and the second section 5.4 as well as the threaded holes and through-holes 3.3, 3.4G, 3.4D associated with the third offset 5.3 and the second section 5.1 are omitted in this embodiment.

Figure 14:
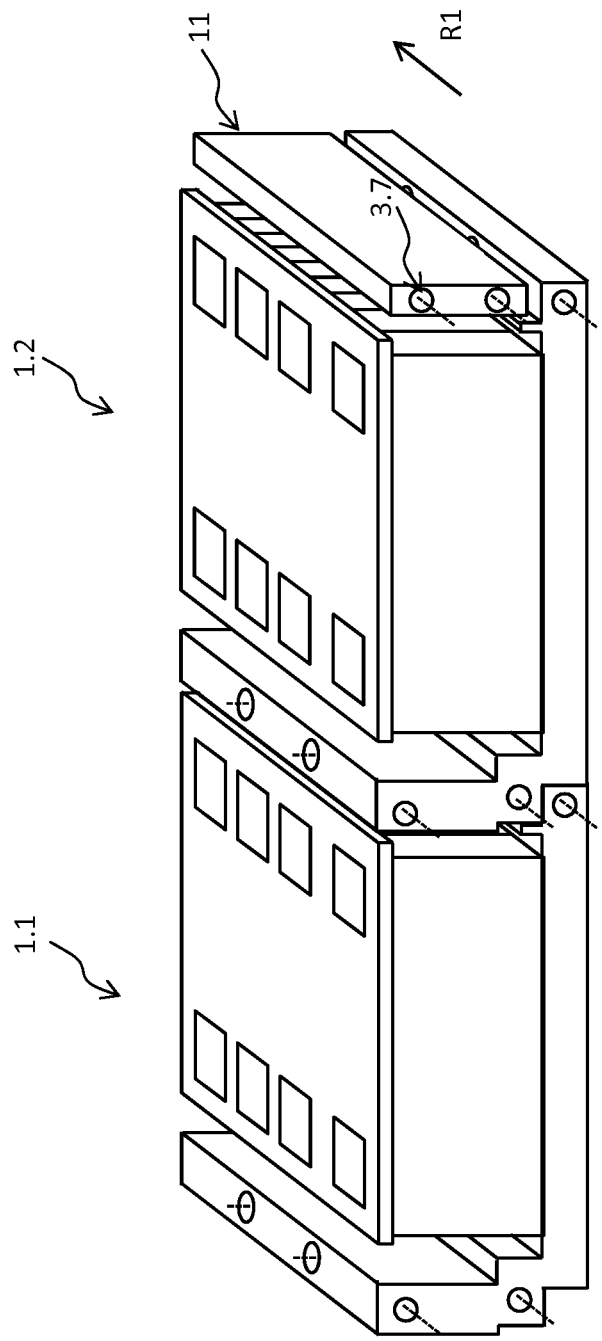
FIG. 14 illustrates a schematic view of two battery modules having a base plate and an additional element, in accordance with embodiments.

FIG. 14 illustrates a schematic view of the first battery module 1.1 and the second battery module 1.2 having the base plate 2 of FIGS. 11 and 12, the cover 5 of FIG. 13, and an additional element 11. Along its first section 2.2, the first battery module 1.1 is arranged on the second battery module 1.2. Since no further battery module is arranged along the first section 2.2 of the second battery module 1.2, the additional element 11 is arranged above the first section 2.2 of the second battery module 1.2. The additional element 11 has seventh threaded holes 3.7, the axes of which extend along the direction R1 of extent.

Figure 15:
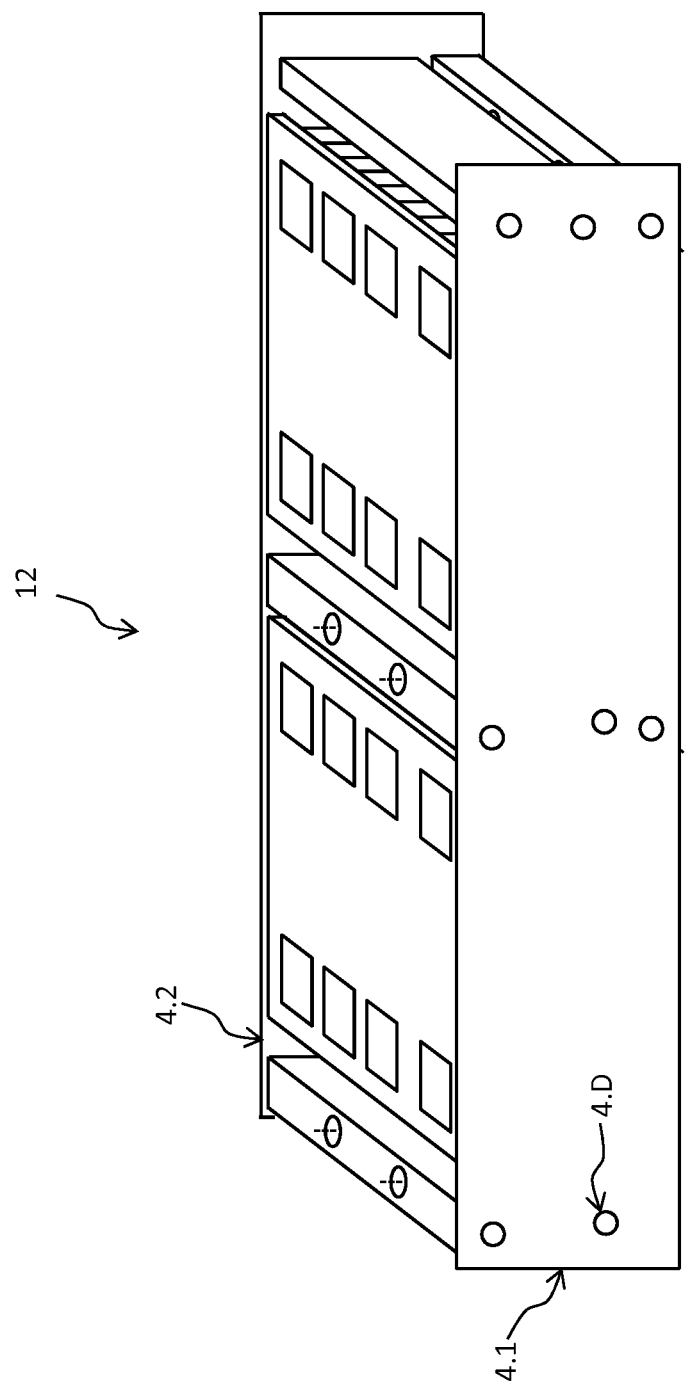
FIG. 15 illustrates a schematic view of two battery modules having a base plate, an additional element and auxiliary frames, in accordance with embodiments.

FIG. 15 illustrates a schematic view of the assembly 12 of two battery modules 1 and the auxiliary frames 4.1 and 4.2. Arranged in the auxiliary frames 4.1 and 4.2 are through-holes 4.D, through which screws (not illustrated) are passed into the first threaded holes 3.1, into the sixth threaded holes 3.6 and into the seventh threaded holes 3.7. The battery modules 1 are thereby connected securely to one another via the auxiliary frames 4.1, 4.2.

Figure 16:
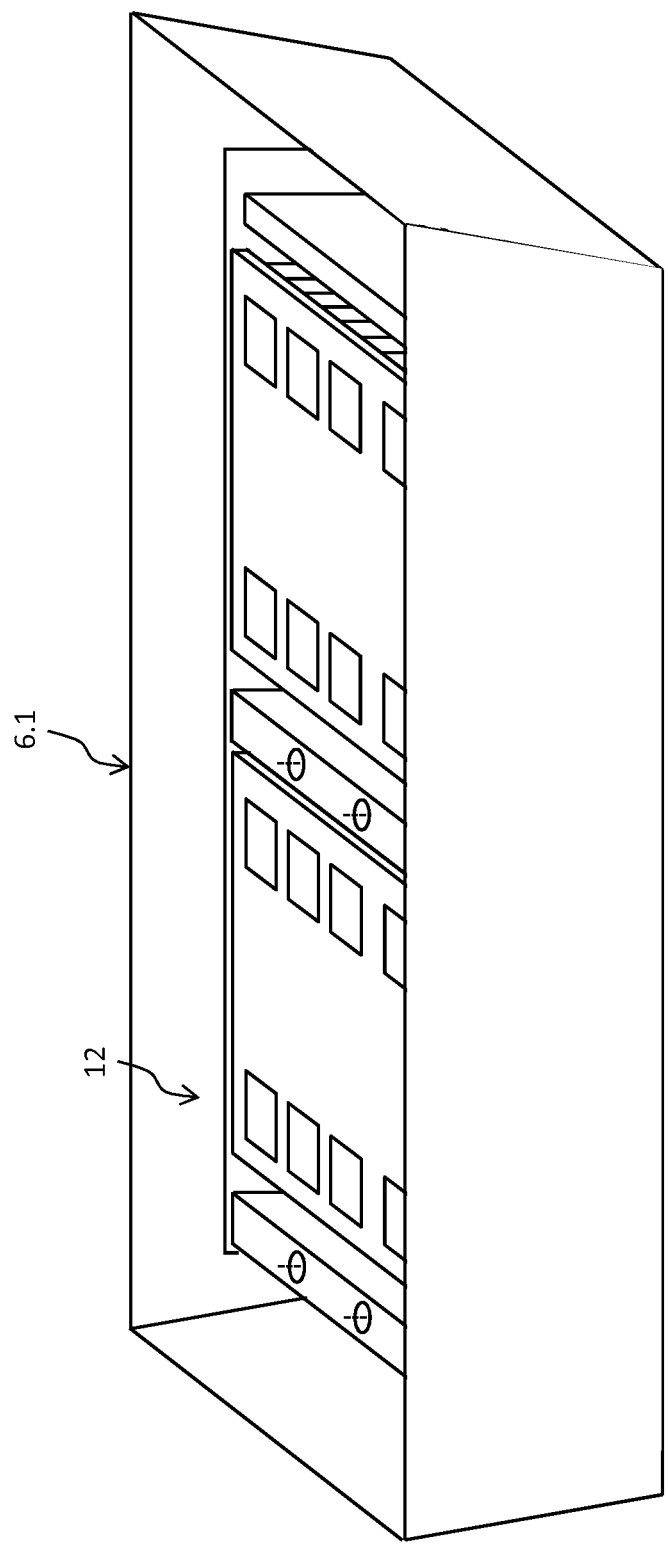
FIG. 16 illustrates a schematic view of two battery modules having a base plate, an additional element and auxiliary frames in a housing shell, in accordance with embodiments.

FIG. 16 illustrates the assembly 12 formed in FIG. 15, as it is arranged in the housing shell 6.1.

Figure 17:
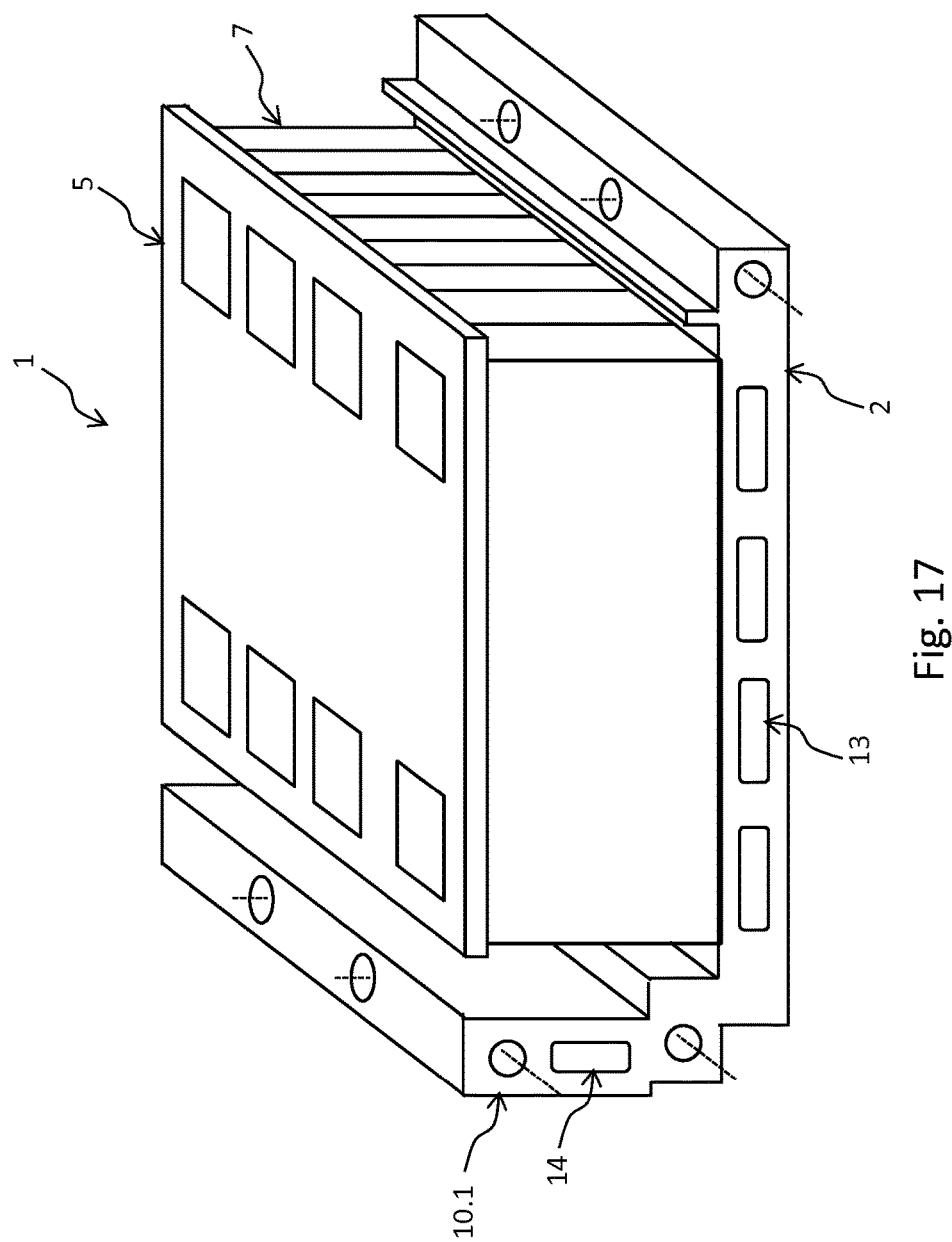
FIG. 17 illustrates a schematic view of a battery module having a covering cap and a base plate with cooling ducts and a cavity, in accordance with embodiments.

FIG. 17 illustrates a view of the battery module 1 with covering cap 5. Cooling ducts 13, through which a fluid may be passed, are arranged in the base plate 2. If the cell stack 7 is connected to the base plate 2 in a manner which allows good heat conduction, waste heat from the cells of the cell stack 7 may be dissipated by way of the fluid. The first web 10.1 of the base plate 2 has a cavity 14. This cavity 14 serves to reduce the weight of the base plate 2. The base plate 2 may be produced by extrusion of a metal such as, for example, aluminium.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SIGNS 1 battery module
1.S1 first end of the battery module
1.S2 second end of the battery module
1.1 first battery module
1.2 second battery module
2 base plate
2.1 first offset
2.1U bottom edge of the first offset
2.2 first section
2.2O top edge of the first section
2.G base surface
3.1 first threaded holes
3.1A axial direction of the first threaded holes
3.2G second threaded holes
3.2D second through-holes
3.2A axial direction of the second threaded holes
3.V threaded connecting holes
3.3 third threaded holes
3.4G fourth threaded holes
3.4D fourth through-holes
3.5 fifth threaded holes
3.6 sixth threaded holes
3.7 seventh threaded holes
4 auxiliary frame
4.1 first auxiliary frame
4.2 second auxiliary frame
4.D through-holes in the auxiliary frame
5 covering cap
5.1 through-holes in the covering cap
5.3 third offset
5.3U bottom edge of the third offset
5.4 second section
5.4O top edge of the second section
6 housing
6.1 housing shell
6.1D through-holes in the housing shell
6.2 housing cover
6.2D through-holes in the housing cover
7 cell stack
8 screw
9 screw
10.1 first web
10.1Z side of the first web which faces the cell stack
10.1W side of the first web which faces away from the cell stack
10.1A recess
10.2 second web
10.2Z side of the second web which faces the cell stack
11 additional element
12 assembly
13 cooling duct
14 cavity
R1 direction of extent of the first offset and the first section
R2 direction of extent of the third offset and the second section

What is claimed is:

1. A battery system comprising:
a plurality of battery modules, each of the battery modules comprising a base plate and a group of cells on a base surface of the base plate, the cells on the base surface of the base plate being arranged adjacent each other in a first direction, the base plate having:
a first offset extending from a first side of the base plate in a second direction perpendicular to the first direction beyond a footprint of the group of cells and extending along the group of cells in the first direction;
a first section extending from a second side of the base plate opposite the first side in the second direction beyond a footprint of the group of cells and extending along the group of cells in the first direction; and
a first threaded hole arranged in each of the first offset and the first section, the first threaded holes respectively extending through the first offset and the first section in the first direction; and an auxiliary frame having auxiliary frame through-holes which correspond to the first threaded holes to connect the battery modules to one another, wherein the first offset protrudes above the base surface of the base plate in a third direction perpendicular to the first and second directions to be above the first section of the base plate such that a bottom edge of the first offset of a second one of the battery modules is arranged spatially above a top edge of the first section of a first one of the battery modules in an installed position of the battery system.

2. The battery system of claim 1, further comprising a covering cap for each of the battery modules, the covering cap having a third offset arranged on a first side of the covering cap and a second section arranged on a second side of the covering cap opposite the first side of the covering cap.

3. The battery system of claim 2, wherein each of the third offset and the second section have a third threaded hole respectively extending through the third offset and the second section in the first direction, and wherein the battery modules are connected to one another via the auxiliary frame by screwing into the third threaded holes through other auxiliary frame through-holes arranged in the auxiliary frame.

4. The battery system of claim 2, wherein a bottom edge of the third offset of the second one of the battery modules is arranged spatially above a top edge of the second section of the first one of the battery modules in the installed position of the battery system.

5. The battery system of claim 2, wherein the third offset has fourth through-holes and the second section has fourth threaded holes.

6. The battery system of claim 1, wherein each of the base plates comprise a cooling element having internal cooling ducts.

7. The battery system of claim 1, wherein the base plate is composed of aluminum.

8. The battery system of claim 1, wherein the group of cells corresponding to each battery module is adhesively bonded to a base surface of the base plate associated with the group of cells.

9. A battery system comprising:

a plurality of battery modules, each of the battery modules having a base plate and a cell stack on a base surface of the base plate, the cell stack comprising a plurality of cells arranged adjacent each other in a first direction, the base plate having a first offset extending from a first side of the base plate in a second direction perpendicular to the first direction and protruding above the base surface in a third direction perpendicular to the first and second directions, a first section extending from a second side of the base plate opposite the first side in the second direction, a first threaded hole arranged in each of the first offset and the first section that respectively extend though the first offset and the first section in the first direction, second threaded holes arranged in the first offset that extend through the first offset perpendicularly to the base surface in the third direction, and second through-holes arranged in the first section that extend through the first section perpendicularly to the base surface in the third direction;

a first auxiliary frame arranged at a first end of the battery modules and having first auxiliary frame through-holes which correspond to the first threaded holes to connect the battery modules to one another;

a second auxiliary frame arranged at a second end of the battery modules opposite the first end of the battery modules and having second auxiliary frame through-holes which correspond to the first threaded holes to connect the battery modules to one another; and a housing having a housing shell, a housing cover, housing through-holes, and housing threaded holes which respectively correspond to the second through-holes and to the second threaded holes to connect the battery modules to the housing shell, wherein, in an installed state, the first offset of a second one of the battery modules is over the first section of a first one of the battery modules, and the second threaded holes in the first offset of the second one of the battery modules are respectively aligned with the second through-holes in the first section of the first one of the battery modules.

10. A battery system comprising:

a plurality of battery modules, each of the battery modules having a base plate and a cell stack on a base surface of the base plate, the cell stack comprising a plurality of cells adjacent each other in a first direction, the base plate having:
 a first section extending from a second side of the base plate in a third direction perpendicular to the first direction;
 a first offset extending from a first side of the base plate opposite the second side in the third direction, the first offset protruding from the base surface in a second direction that is perpendicular to the first direction and to the base surface to be above the first section;
 a first threaded hole arranged in each of the first offset and the first section and that respectively extend through the first offset and the first section in the first direction,
 second threaded holes arranged in the first offset and that extend through the first offset in a second direction that is perpendicular to the first direction and to the base surface,
 second through-holes arranged in the first section that extend through the first section in the second direction; and
 a first web which extends upwardly from the first offset and in the second direction, an inner surface of the first web being farther from the cell stack than an inner surface of the first offset is;

an auxiliary frame to connect the battery modules to one another; and a housing connected to the battery modules, the housing having a housing shell and a housing cover.

11. The battery system of claim 10, wherein:
the first web has fifth threaded holes extending through the first web in the second direction, and
the battery modules are connected to the housing cover via the fifth threaded holes and corresponding through-holes in the housing cover.

12. The battery system of claim 10, wherein:
the first web has sixth threaded holes that extend through the first web in the first direction, and
the battery modules are connected to one another via the sixth threaded holes and corresponding through-holes in the auxiliary frame.

13. The battery system of claim 10, further comprising an electrically insulating coating on a side of the first web which faces the cell stack of the battery module.

14. The battery system of claim 10, further comprising a recess on a side of the first web which faces away from the cell stack of the battery module.

15. The battery system of claim 10, wherein the base plate of each of the battery modules has a second web which extends upwardly from the first section and perpendicularly to the base surface of the base plate.

16. The battery system of claim 15, wherein the second web has a width which is less than a width of the first web and a height which is less than a height of the first web.

17. The battery system of claim 15, further comprising an electrically insulating coating on a side of the second web which faces the cell stack of the battery module.

18. The battery system of claim 15, further comprising an element provided adjacent the second web at the first section and which is connected to the auxiliary frame.

19. The battery system of claim 15, further comprising a recess on a side of the first web which faces away from the cell stack of the battery module,
   wherein the recess in a second one of the battery modules is to receive the second web of a first one of the battery modules.

* * * * *